Patented Feb. 28, 1939

2,148,833

UNITED STATES PATENT OFFICE 2,148,833

MANUFACTURE OF SOLVATED RUBBER CHLORIDE COMPOSITIONS AND THE LIKE

James Wallace Raynolds, Nitro, W. Va., assignor to The Raolin Corporation, Charleston, W. Va., a corporation of West Virginia No Drawing. Application March 17, 1936, Serial No. 69,416

9 Claims. (Cl. 134—17)

This invention relates to the manufacture of solvated rubber chloride compositions and the like; and it comprises methods of making such compositions wherein rubber chloride or the like in major amount is solvated or fluxed with a chemically inert permanent miscible fluxing agent or plasticizer, in amount sufficient to form a unitary, homogeneous or single phase composition of fluxed rubber chloride, the unitary solvated composition being sometimes afterwards compounded with additional ingredients or thinned with and dispersed in volatile solvents; and it also comprises the unitary, homogeneous solvated compositions so obtained, ranging from solid thermoplastic masses to liquid coating compositions, said compositions being capable of yielding coatings or films which are impervious, non-brittle and have a resistance to reagents comparable with that of rubber chloride itself; all as more fully hereinafter set forth and as claimed.

Rubber chloride carrying 64–66 per cent chlorine has long been known and can be made in various ways. In a solid dry state, it is a friable, brittle resin of interesting properties, it being practically flame-proof and resistant to the action of most ordinary liquids: water, aqueous solutions of acids, salts or alkalies, alcohols, ketones, etc. It is indifferent to aliphatic (petroleum) hydrocarbons such as kerosene and lubricating oil and to glycerine. It neither dissolves in these materials nor does it dissolve them in any substantial amount. It is, however, soluble in a few liquids, among them, carbon tetrachloride and other chlorinated hydrocarbons and various coal tar solvents such as benzol, toluol, etc.

Despite having inherent properties desirable in a protective coating, rubber chloride has not enjoyed as wide commercial utilization as might be. It is difficult to produce rubber chloride films or coatings having a permanent inertness, comparable to that of rubber chloride itself. Rubber chloride is not thermoplastic. It is infusible and chars at a temperature about 150° C. Consequently, it cannot be directly converted into shaped articles or protective films or coatings. Expedients are necessary to render it plastic or liquid; that is, shapable. And the usual expedients result in production of an ultimate rubber chloride protecting film of degraded quality.

Solutions of rubber chloride in toluol or other aromatic hydrocarbons have been used to form coatings. The dried films obtained have not been commercially satisfactory as protective coatings. They have a pleasing appearance when first made, but they are not stable. They are too brittle, the aged coatings being as brittle as the original rubber chlorid.

Efforts have been made to produce rubber chloride coating compositions which will give a non-brittle film. Liquid coating compositions have been made by taking a dilute solution of rubber chloride in toluol or the like and adding thereto fatty oils, synthetic resins and plasticizers. Such mixtures yield non-brittle coatings, but the coatings are not nearly so inert as plain rubber chloride. Film flexibility is secured at the sacrifice of many of the desirable qualities of rubber chloride.

Many rubber chloride coatings when first made look all right and stand up under tests. But in the course of time defects develop. In fact, their behavior after being aged, under various service conditions is so erratic that it has been difficult to determine the real causes of their failure. Certain accelerated tests yield valuable information as to the properties of rubber chloride films, and serve to reveal inherent defects. By boiling the coating in water, the presence of residual volatile solvent can be readily detected by the eye; the film being ruptured or becoming blistered by expulsion or volatilization of trapped solvent. Upon steaming the coating, spots of free plasticizer are shown by the formation of a lace pattern. By immersing coated metal strips or rods in strong reagents, the reagents strike through the film or coating and react with the underlying metal showing the exact points at which the film failed. In such case, as rubber chloride itself is resistant to the reagents employed, the reagents must be carried through the film by an ingredient which is not resistant to penetration by the reagent. Application of these tests is described in more detail post.

In applying these tests to various rubber chloride coatings as well as to rubber chloride itself, I have been able to discover not only the character of the deficiencies of such coatings but also the causes thereof. Rubber chloride in ordinary volatile solvents on drying tenaciously holds a small but substantial amount of the solvent. This is true both of the simple solutions and of the liquid coating compositions obtained by adding the ordinary plasticizers to such solutions. Furthermore, the ordinary plasticizers do not remain miscible with the rubber chloride when the bulk of the volatile solvent evaporates. They appear as a more or less independent component or phase in the mixed film. It is is this segregated plasticizer that renders the rubber chloride film attackable in use. Many of the prior difficulties in adjusting the amount of ordinary plasticizer to overcome the inherent brittleness of the rubber chloride have been due to the pseudo plasticization resulting from the residual volatile solvent initially retained in the rubber chloride, after a film dry to touch has been obtained. This accounts for the fact that films develop brittleness upon aging, there being insufficient plasticizer to compensate for the loss of plasticity when the residual solvent disappears. On the other hand, if the initial amount of plasticizer is sufficient to render the aged coating non-brittle, then the film is too slow drying and will become quite tacky at elevated temperatures, even after it has been aged a relatively long time. Also, with sufficient non-solvent plasticizer to permanently obviate brittleness, the excess plasticizer markedly lowers the film resistance to ordinary reagents, particularly in the beginning.

In the present invention I utilize the properties of solvent plasticizers; substances which will enter into single phase union with rubber chloride as contradistinguished from plasticizers of less miscibility. The best solvent plasticizers I have found belong to the class including the butyl ether of glycol stearate (commercially known as butyl cellosolve stearate). These bodies have good physical and chemical properties for the present purposes and form single phase homogeneous structureless continua in which rubber chloride may be a minor or a major constituent. Rubber chloride will dissolve in butyl cellosolve stearate to form a homogeneous liquid without separation of another phase and, which is much more to the present purpose, rubber chloride will take up a minor amount of butyl cellosolve stearate in solid solution to form a homogeneous single phase composition lacking the brittleness of rubber chloride alone. Practically, however, I use a small amount of a blending solvent such as toluol, to promote convenient incorporation. If the amount of toluol is not too great, a liquid or soft product can be obtained without separation of another phase.

Better coatings can be obtained by adding solvent plasticizers instead of non-solvent plasticizers, directly to a rubber chloride solution or varnish. But when solvent plasticizers are so added they do not become fully and completely absorbed by the rubber chloride in the dry film, despite their solvent power for the rubber chloride. So long as the rubber chloride is saturated with the volatile solvent in the semi-dry film, it will not absorb the solvent plasticizer. Consequently, the evaporation of the volatile solvent leaves substantial amounts of the solvent plasticizer as a separate component or phase of the mixed film, rendering it attackable by certain reagents. When the amount of added solvent plasticizer is restricted, to improve the chemical resistance of the dry film, the amount present is often insufficient to fully obviate its brittleness after the last traces of residual solvent has been dissipated, while if sufficient solvent plasticizer has been added to render the coating permanently flexible, then a portion of the plasticizer may remain in a condition attackable by strong reagents.

Heretofore, non-uniformity in mixed film coatings has not been considered nor has its bearing upon the ultimate success of the coating been recognized. Non-solvent plasticizers have been widely used despite the fact the coatings obtained inherently had a resistance which is no better than that of the non-solvent plasticizer itself. For instance, varnishes have been made by adding tung oil and like non-solvents for rubber chloride to solutions of rubber chloride in toluol and dried coatings of excellent appearance obtained. But in such films the tung oil is the continuum, the rubber chloride actually existing as a sort of filler; a dispersoid. The chemical resistance and other properties of the dried film are those of tung oil and not of rubber chloride.

I have found that for full utilization of the chemically resistant character of rubber chloride, either in varnish coatings or shaped articles, it should exist in major proportion and as a continuum holding the plasticizer in homogeneous solution and being free of exposed portions, or segregated phases, of more attackable material. In the present invention I secure this result by incorporating a minor amount of a softening and plasticizing agent in a major amount of rubber chloride in homogeneous combination; the rubber chloride being a continuous phase.

In this way I obviate the defects which were previously encountered with these coatings by eliminating the causes thereof.

In dispersing the plasticizer in the rubber chloride, the rubber chloride is fluxed with substantially permanent, miscible fluxing agents or plasticizers; a small amount of volatile solvent being ordinarily used to aid in blending. In so doing the rubber chloride takes up fluxing agent, softens and swells. This action, which is in effect forming a homogeneous solution of a liquid in a solid, I term solvation. The amount of plasticizer or fluxing agent employed is sufficient to form a unitary homogeneous composition with the rubber chloride in which the latter is the major component. The amount is always insufficient to cause any dispersion of the swollen rubber chloride in whatever liquid may be employed at that stage; this preventing an undesirable reversing of the phases. The solvated rubber chloride composition can be thinned with volatile thinners in which rubber chloride is not soluble to an indefinite extent, thereby producing a fine dispersion of particles of solvated rubber chloride in the thinner. Upon evaporation of the thinner, the solvated rubber chloride particles reform a continuous film or mass in which the rubber chloride is still the continuum; the fluxing agent, plasticizer or other modifier remaining therein. By adjusting the amount of added volatile thinner, plastic as well as directly flowable liquid compositions can be obtained. In other words, once the rubber chloride is solvated, the fluxing agent remains in its original association with the rubber chloride and persists in that condition throughout all the subsequent processing, and in the final film or article.

In the present invention the first step is to flux the rubber chloride and the softening agent to form a homogeneous unitary mass in which the rubber chloride exists in major proportion and as a continuum. Agitation and warming expedite the action. The rubber chloride takes up solvent forming a mass of solid solution which progressively swells and becomes softer as the percentage of absorbed solvent increases. The amount of fluxing agent is restricted to prevent the formation of a solution of rubber chloride in the solvent; that is, to prevent the solvent from becoming the external phase. The liquid enters the solid rather than the solid entering the liquid. The order of steps in compounding the rubber chloride with the plasticizer and other ingredients is important.

Many types of permanent fluxing agents may be employed for solvation; the primary requisites being that they have substantial solvent power for rubber chloride and do not react with it. Fluxing agents having relatively high molecular weights and boiling points are advantageous. These solvents or plasticizers should be liquids or low-melting solids, to permit solvation at moderate temperatures. Those which are resistant to water and to other reagents are particularly advantageous.

The best solvent plasticizers I have found for the present purposes are represented by a class of ether esters of which the stated butyl cellosolve stearate is typical.

These esters may be represented by the following formula:

H₃C—(CH₂)ₓ—O—[—(CH₂)ₓ—O—]ₘ—(CH₂)ₓ—O—C—R₁
‖
O wherein
  $x$ is at least 1,
  $m$ is 0 to 2 and
  R₁ may be a group of the following types:

(a)        —CH₂—(CH₂)ₓ—CH₃ wherein $x$ is 1 to 15;

(b)   —(CH₂)ₓ—CH₂—C=C—CH₂—(CH₂)ₓ—CH₃
                       H H wherein $x$ is 0 to 8.

The mono-ether esters may be obtained from the alkyl ethers of ethylene glycol. The di- and tri-ether esters are formed respectively from

1.   R₂—O—R₂—O—CH₂—CH₂—OH and

2.   R₂—O—R₂—O—R₂—O—CH₂—CH₂—OH wherein R₂ is an alkyl group.

The esters obtained from the methyl, ethyl, butyl, ethoxy-ethyl, butoxy-ethyl and butoxy-ethoxy-ethyl ethers of ethylene glycol are advantageous.

In U. S. Patent No. 2,010,560 to C. O. North are disclosed methods of preparing such ether esters: for instance, the oleates of the mono-, di- and tri-ether ethylene glycols, such as the alkyl ethers of ethanol and the alkoxy-alkyl ethers of ethanol.

The oleates, palmitates and stearates of the above mentioned ether alcohols are advantageous, particularly those in which the alcohol component is

—O—CH₂—CH₂—O—(CH₂)ₘ—CH₃ wherein $m$ is 0 to 3.

The following compounds and their structural formulae are illustrative:

Butyl ether of ethylene glycol stearate,

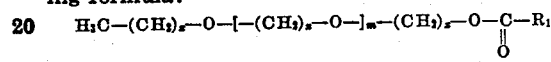

Methyl ether of ethylene glycol palmitate,

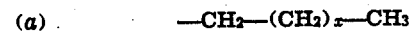

Methyl ether of ethylene glycol oleate,

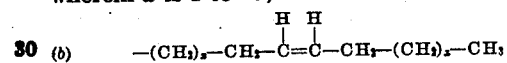

Ethyl ether of ethylene glycol oleate,

Ethyl ether of ethylene glycol acetyl-ricinoleate,

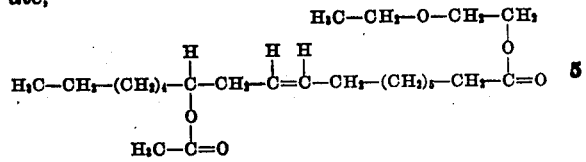

The solvent plasticizers of the class stated are useful in the present invention and are liquids or low melting solids permanent in air and having no substantial vapor tension at ordinary temperatures, being sufficiently non-volatile to remain in the dried coating indefinitely and soluble in or miscible with thinners.

The above mentioned solvent plasticizers are relatively stable and are inert chemically having but little reactivity. Being ethers, they resist hydrolysis. They have relatively high molecular weights and boiling points. They are substantially non-volatile and in the solvated composition serve as permanent solvents or softeners. Their molecular weight is substantially above 200 and they do not boil below 150° C., the temperature at which rubber chloride chars. At lower temperatures, their vapor pressure is insufficient to cause a material dissipation of the plasticizer from the composition. In other words, rubber chloride solvated with these solvent plasticizers is a practically stable permanent composition.

Most of them have a marked solvent power for rubber chloride and when dissolved in the rubber chloride in amounts approaching 1 mol of plasticizer to 1 mol of rubber chloride, unitary compositions are obtained which are mobile or fluid at elevated temperatures; sometimes at room temperature. For most purposes a much smaller amount of solvent plasticizer will markedly plasticize the rubber chloride and yield unitary compositions which are thermoplastic; compositions which readily flow at elevated temperatures under moderate pressure. With as little as 5 per cent of solvent plasticizer alone, the solvated rubber chloride may be a relatively hard but non-brittle solid which softens and flows under suitable pressure at temperatures well below 150° C. In other words, by adjusting the percentage of solvent plasticizer absorbed in the rubber chloride, a wide range of products may be obtained with these two ingredients alone.

Rubber chloride in granular, relatively dense form may be directly solvated with solvent plasticizer alone, in large or small proportions, by wetting the rubber chloride with solvent plasticizer and warming to obtain a mass which can be worked into a plastic mass in ordinary heat-jacketed internal mixers provided with suitable blades or the like. Then while working the mass more plasticizer is gradually added if necessary.

However, rubber chloride is more usually supplied commercially as a voluminous, light, porous material having a sort of "pop-corn" consistency. The volume-weight ratio is high. Consequently it takes a relatively large amount of plasticizer to uniformly wet the material, the amount sometimes being greater than is desirable in the product. For example, a mixture of 1 molar weight of rubber chloride with 1 molar weight of butyl cellosolve stearate is so permanently soft and plastic that it must be petronized to obtain firm coatings. (Petronization of rubber chloride compositions is described and claimed in my copending application Ser. No. 69,414.)

Thus, in using the more common commercial forms of rubber chloride, it is best to dilute the solvent plasticizer with other solvents for the rubber chloride, to insure thorough wetting. The solvent can be high-boiling or low boiling, depending upon the use to which the rubber chloride composition is to be put. The use of such solvents is often advantageous for other reasons besides insuring wetting.

In previous methods of forming liquid compositions useful for coating, dilute solutions of rubber chloride per se in toluol and other volatile solvents were employed. The customary practice is to add the rubber chloride to an amount of toluol several times its volume. The minimum amount of toluol so employed is that which will give a solution containing about 33 per cent rubber chloride; a 2:1 ratio by weight to rubber chloride. Then this solution or varnish base so obtained, is ordinarily diluted with more solvent to obtain a liquid coating composition of the required viscosity, etc. Here, I employ much less solvent than even that previously employed in preparing the initial solution or varnish base. Also the solvents, for the most part, are of a different character, being used for a different purpose.

From rubber chloride more or less saturated with solvent plasticizers or other high boiling solvent, plastic products can be produced which are quite resistant to dilution with volatile solvents. That is, some of the solvated plastic rubber chloride compositions are not readily dispersible in volatile thinners. They have the property of absorbing a little volatile solvent and becoming softened thereby, without dissolving to any great extent. When a large amount of volatile thinner is added to such a solvated composition, only a small proportion of the thinner is absorbed. Most of it remains as a distinct supernatant liquid. This new type of solvated rubber chloride composition is particularly useful for making shaped articles by hot pressing or for coating metals, etc., by methods wherein the coating is applied in a thermoplastic condition such as roller coating or calendering. The compositions, softened with a little solvent, can be hot milled and compounded with fillers and other ingredients to obtain a wide range of sheeted materials, etc., useful for various purposes. The compositions flow under pressure at room temperatures or slightly above. The absorbed volatile solvent evaporates when the coating is subsequently baked.

Solvents used in conjunction with a solvent plasticizer in making rubber chloride compositions under the present invention should have considerable vapor tensions but relatively high boiling points and molecular weights. Their molecular weights should be above 115, and usually in the range 115–200. The boiling point at atmospheric pressure should be at least 150° C. In contradistinction to the solvent plasticizers, which also have high boiling points and high molecular weights, the additional high boiling solvents used have substantial vapor pressure at temperatures below their boiling point, and can be evaporated from the applied coatings, etc., but they are retained in the composition under ordinary conditions prior to drying. Their molecular affinity for the rubber chloride should be relatively low. The solvent plasticizers have a high molecular affinity and remain permanently united with the rubber chloride. So to speak, the solvent plasticizer is a permanent solvent whereas the other high boiling solvents are more or less temporary solvents or plasticizers; their transitory character depending upon both their vapor pressure and their molecular affinity for the rubber chloride.

The following are typical examples of high boiling solvents useful in conjunction with the solvent plasticizers:

| Name | B. P., °C. | Molecular weight |
|---|---|---|
| Decalin (decahydrogenated naphthalene) | 189–191 | 138 |
| Tetralin (tetrahydrogenated naphthalene) | 205–215 | 134 |
| Paracymene | 175–177 | 134 |
| Monochlor naphthalene | 240–280 | 175 |

In adjusting the ratio of the high boiling solvent to the rubber chloride, the molecular weight and molecular affinity of the solvent are important. Generally, less than one molecular proportion of such solvents is used to solvate the rubber chloride. An advantageous molecular ratio of high boiling solvent to rubber chloride is 0.5:1. Ordinarily the proportions are such that the net weight of solvent is less than that of the rubber chloride; the rubber chloride is a major component.

The solvent plasticizers have a somewhat higher molecular weight than the high boiling solvents, consequently the net weight ratios with respect to the rubber chloride are somewhat higher, for equivalent molecular proportions, than in the case of the solvents. The molecular proportion by weight and the actual proportion by weight of solvent plasticizer in the rubber chloride are generally less than in the case of solvents; being in most cases less than 0.4:1. Ordinarily the total proportion of fluxing agent, including both solvent plasticizer and removable solvent, is, as regards both molecular weights and actual weights, less than the proportion of rubber chloride. As shown in illustrative examples given post, less than 0.1 mol of solvent plasticizers, together with less than 0.5 mol of high boiling removable solvent will satisfactorily plasticize 1 mol of rubber chloride.

For practical purposes, the molecular weight of rubber chloride, (properly made material) may be taken as 381.15; the molecular weight corresponding to rubber heptachloride, namely $C_{10}H_{13}Cl_7$.

The amount of fluxing agent and of high boiling solvent is, as stated, sufficient to wet and flux the rubber chloride into a uniform composition. The amount depends upon the particular procedure used in solvation and upon the apparent density or bulkiness of the particular rubber chloride used. The amount of solvent plasticizer (permanent solvent) to be incorporated in the rubber chloride determines whether or not dilution with high boiling removable solvent is necessary and when necessary, what ratio of it will give sufficient mixed liquid for wetting and fluxing.

Thus in solvating the rubber chloride I may use a liquid mixture for fluxing, which is a balanced solvent. The balance is adjusted to control and correlate the consistency, rate of drying, etc., of the solvated material and the hardness, flexibility, etc., of the final dried product or coating. The balanced relationship is obtained by varying the individual solvents according to their molecular weight.

In one mode of operation, into a suitable vessel there are introduced 100 parts of butyl cellosolve stearate, 500 parts of tricresyl phosphate, 150 parts of decalin and 300 parts of xylol (10°). These liquids are agitated until completely mixed and a uniform solution is obtained. Then 1650 parts of rubber chloride are added. The vessel is then closed and made vapor tight. The vessel is heated and the materials brought to a temperature of about 80° C. and maintained at approximately 80° C. under pressure due to solvent vapors until the materials are fluxed and a solvated rubber chloride is obtained. With suitable internal agitation, about 36 hours are required to complete the solvation.

The rubber chloride composition so obtained is a soft solid at room temperature, is thermoplastic and is an excellent material for producing either liquid or plastic coating compositions.

The rubber chloride composition so obtained may be converted into varnishes by adding sufficient volatile liquid as a thinner to produce liquid compositions having the desired viscosity.

Advantageously, the volatile liquid should be added to the solvated rubber chloride while still warm and in the same vessel, the thinner being added after the solvation has been completed and the material partially cooled. By so adding to the partially cooled solvated composition at approximately 65° C. a volatile liquid mixture as below, good varnish is made.

| | Parts |
|---|---|
| p-Cymene | 120 |
| High flash solvent naphtha | 900 |
| Toluol | 1535 |
| Xylol | 1750 |

It is advantageous to warm and agitate the thinned mixture for several hours to obtain a complete dispersion of the rubber chloride composition in the added liquid. Ordinarily the volatile solvent is gradually added to the warm solvated rubber chloride. In this way, the solvated composition gradually becomes permanently and uniformly dispersed and suspended in the volatile liquid.

If desired, the solvated rubber chloride may be first dispersed in part of the additional liquid to obtain a thick varnish base suitable for pigmentation and after the pigments have been ground in the mass thinned with the rest of the liquid. The p-cymene can be used as a part of the solvating liquid.

In manufacturing plastic masses the solvation procedure may be slightly modified by limiting the amount of volatile liquid, producing a solid thermoplastic mass upon cooling. For instance, the amount of removable solvents, that is, high flash naphtha, decalin and p-cymene may be reduced and adjusted to give compositions fluid at the solvation temperature but solid or semi-solid at room temperature. The fluxed or solvated rubber chloride is removed from the vessel while sufficiently hot and fluid. The amount of solvent and non-solvent plasticizers in the above procedure may be likewise adjusted to produce thermoplastic masses. In some cases, the amount of non-solvent plasticizer may be considerably reduced. Again, the amount of solvent plasticizer may be increased to give masses mobile at solvation temperature. When little or no readily volatile solvent is present, somewhat higher temperatures may be used for fluxing without developing excessive pressure. Various adjustments may be made in the solvation procedure to obtain a wide range of plastic compositions.

Also, plastic compositions may be obtained by using greater amounts of volatile solvents and removing the more volatile material from the solvated composition. In this way by suitable adjustment even hard compositions grindable to a powder at room temperature but flowing under relatively high pressure at elevated temperatures may be obtained. These molding powders are permanently thermoplastic and are adaptable to the so-called hot-pressing methods. Heat-hardening compositions suitable for the so-called, hot pressing wherein hardening is effected during the molding rather than by subsequent cooling, may be obtained by admixing the thermoplastic powder with the patronizing agents disclosed in my copending application Serial No. 69,414.

For instance, the tricresyl phosphate may be omitted in the solvation method given ante and the amount of butyl cellosolve stearate increased to 415 parts.

In compositions coming under the present invention I have found an interesting relationship by recalculating weights to molecular ratios. In a good composition, the molecular weight of other things present, (plasticizers, solvents, both high boiling and low boiling, etc.), should not be more than 2:1 as compared with the rubber chloride. And in most cases, a ratio not over 1.5:1 is better. These ratios are important not only as regards volatile solvent which must be expelled in making the final preparation, but also as regards the high boiling liquids or plasticizers or solvating agents which are to form a permanent part of the final film or molded article, as the case may be. With a molecular ratio of solvating agent to rubber chloride of more than 0.4:1, the final compositions are too soft to be useful even if they be hardened by baking and some other special ways. Ordinarily lower ratios of solvating bodies are desirable, whether the solvating agent be one that is wholly miscible with rubber chloride, as in the case of butyl cellosolve stearate, or one that is miscible only with difficulty as in the case of tricresyl phosphate. In the event that other materials, say castor oil for example, are to be used in the film for special reasons, these restrictions do not apply.

In all varnishes, lacquers, etc., the viscosity of the liquid is an important consideration since the viscosity offers an upper limit to the amount of solids which can be put into a gallon without forfeiting brushability or sprayability. Rubber chloride solutions have mostly a rather low value on an ounce per gallon basis. In solvating rubber chloride in the way described ante, I find there is an important lowering in viscosity or, in other terms, an important increase in amount of solids per gallon of varnish for brushing or spraying consistency. In the heating and treatment described ante, a rubber chloride which in plain solution in toluol would have a viscosity, as determined in a Ford cup, of perhaps 27 seconds; after 24 hours gave a viscosity of 19 seconds which on continuing the heating to 48 hours dropped to 15 seconds. There was a further drop in further heating but not of great magnitude; 72 hours giving 13 seconds and 96 hours 10 seconds. This viscosity did not change materially where the liquid was allowed to age, say for 48 hours, the 19 seconds viscosity becoming 21 seconds, the 15 seconds 17 seconds, etc. On two weeks' aging the viscosities were about the same. In other words, the diminution in viscosity produced in solvation is tolerably constant.

In varnishes under the present invention of a brushable or sprayable consistency, I have found it advantageous to use some additional thinner of what I may call a "non-solvent" type; the alcohols, which usually contain more or less water, coming under this heading. For example, I have found that a small addition, say about 0.1 per cent on the rubber chloride, of commercial methyl alcohol or methanol to the varnish produces an important thinning action and gives, for some reason, greater certainty in obtaining a flawless film.

In solvating rubber chloride with a permanent soft material which is to form part of the final composition, whether it be a dry varnish film or cured plastic, it is a matter of convenience to use a little volatile solvent to quicken and facilitate blending; the amount of such solvent required being, to a certain extent, inversely proportional to the efficiency of the agitation and being dependent on the particular way of heating the three bodies together, the rubber chloride, the plasticizer and the blending solvent. As a matter of mechanical convenience, it is often desirable to soften the rubber chloride with the volatile solvent prior to adding the plasticizer. The upper limit of the amount of volatile solvent to be added is, of course, that which will go into unitary, homogeneous blending with the rubber chloride and the plasticizer.

What I claim is:

1. In an improved process of manufacturing solvated rubber chloride compositions, the steps which comprise adding to a bulky mass of hard, brittle rubber chloride, a mixed solvent comprising a high boiling ether ester having no substantial vapor tension at ordinary temperatures, as a permanent, miscible, chemically inert fluxing agent, an ordinarily less miscible chemically inert plasticizer, and high boiling, volatile solvent, the amount of mixed solvent so added being less than the amount of rubber chloride employed and then warming the mixture to temperatures between 60° C. and 90° C. to flux the said materials with the rubber chloride and produce a fluxed single-phase rubber chloride composition containing the other materials dissolved therein.

2. The process of claim 1 wherein a prior made fluxed rubber chloride composition so produced is subsequently dispersed in a relatively larger amount of readily volatile solvent, to produce a varnish comprising swollen particles of said fluxed rubber chloride uniformly dispersed and suspended in said volatile solvent, the volatile solvent serving as a vehicle to render the composition liquid at ordinary temperatures.

3. The process of claim 1 wherein the fluxed rubber chloride composition is cooled to room temperature to obtain a solid thermoplastic mass and the solid thermoplastic mass so obtained is subsequently shaped under suitable heat and pressure, the temperature employed being sufficient to render the fluxed composition flowable under the pressure applied.

4. As an improved rubber chloride composition a fluxed rubber chloride comprising rubber chloride fluxed with minor amounts of butyl cellosolve stearate and tricresyl phosphate, diluted with a mixture of decalin, p-cymene, and xylol, all of said materials being dissolved in said solvated rubber chloride and forming, together therewith a unitary single-phase homogeneous composition which is thermoplastic and is capable of being dispersed in additional volatile solvent.

5. In the manufacture of fluxed rubber chloride compositions containing rubber chloride as a continuum and having the fluxing agent dissolved in the continuum of rubber chloride to plasticize the same, the improvement which comprises mixing a volatile solvent for the rubber chloride with a high boiling, relatively non-volatile softening agent capable of dissolving in rubber chloride and of plasticizing rubber chloride when dissolved therein, adding a minor amount of this mixed solvent to a major amount of fluffy, bulky rubber chloride, heating the mixture to a temperature sufficient to vaporize a part of the volatile solvent, said heating being under pressure equivalent to the vapor pressure of the said vaporized volatile solvent, and continuing said heating until the rubber chloride is fluxed into a continuum containing both the volatile solvent and permanent plasticizer dissolved therein, the amount of mixed solvent being sufficient to so flux the rubber chloride but insufficient to destroy the continuity of the fluxed rubber chloride and said softening agent having a molecular weight of at least 200 and a boiling point not less than 150° C. and having substantially no vapor pressure at ordinary temperatures.

6. The process of claim 5 wherein said softening agent is butyl cellosolve stearate and said volatile solvent is xylol.

7. The process of claim 5 wherein the fluxed rubber chloride continuum is subsequently diluted with a balanced solvent comprising paracymene, high flash solvent naphtha, toluol and xylol and the mixture warmed and agitated until the fluxed rubber chloride is dispersed in said balanced solvent, the varnish so produced being capable of yielding non-brittle, non-porous films in which the rubber chloride is the continuous phase, upon evaporation of said volatile solvents.

8. As a new composition of matter, a fluxed rubber chloride preparation comprising a unitary homogeneous one-phase composition of rubber chloride and a minor amount of a high boiling ether ester as a miscible chemically inert fluxing agent permanent in air, said ether ester being dissolved in the rubber chloride, and said composition being thermoplastic and also containing another solvent for the rubber chloride having a substantial vapor pressure at room temperature, and being capable of subsequent removal from the thermoplastic composition without disturbing the union of the rubber chloride and fluxing agent.

9. As a new composition of matter, a fluxed rubber chloride preparation comprising a unitary homogeneous one-phase composition of rubber chloride and a minor amount of a high boiling ether ester as a miscible chemically inert fluxing agent permanent in air, said ether ester being dissolved in the rubber chloride, and said composition being thermoplastic and also containing a minor amount of plasticizer ordinarily less miscible with rubber chloride than the said ether ester, the additional less miscible plasticizer being held in permanent solution in the rubber chloride by the fluxing action of the ether ester.

JAMES WALLACE RAYNOLDS.